(12) United States Patent
Krishnamoorthy

(10) Patent No.: US 11,295,483 B1
(45) Date of Patent: Apr. 5, 2022

(54) SYSTEM FOR IMMERSIVE DEEP LEARNING IN A VIRTUAL REALITY ENVIRONMENT

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 4 days.

(21) Appl. No.: 17/060,115

(22) Filed: Oct. 1, 2020

(51) Int. Cl.
```
G06T 11/00    (2006.01)
G06F 3/01     (2006.01)
G06F 3/0481   (2022.01)
G06K 9/62     (2022.01)
G06V 10/46    (2022.01)
```

(52) U.S. Cl.
CPC .............. *G06T 11/00* (2013.01); *G06F 3/011* (2013.01); *G06F 3/0481* (2013.01); *G06K 9/628* (2013.01); *G06K 9/6215* (2013.01); *G06K 9/6218* (2013.01); *G06K 9/6232* (2013.01); *G06V 10/462* (2022.01); *G06T 2200/24* (2013.01)

(58) Field of Classification Search
CPC ...... G06T 11/00; G06T 2200/24; G06F 3/011; G06F 3/0481; G06K 9/4671; G06K 9/6215; G06K 9/6218; G06K 9/6232; G06K 9/628; G06V 10/462
See application file for complete search history.

(56) References Cited

U.S. PATENT DOCUMENTS

| | | | |
|---|---|---|---|
| 8,907,971 B2 * | 12/2014 | Ballestad | G06T 5/009 345/589 |
| 9,311,531 B2 * | 4/2016 | Amtrup | G06K 9/00536 |
| 9,681,096 B1 | 6/2017 | Motta et al. | |
| 9,847,079 B2 | 12/2017 | Clement et al. | |
| 9,904,690 B1 * | 2/2018 | Ferries | G06F 16/5838 |
| 10,025,950 B1 * | 7/2018 | Avasarala | G06V 10/454 |
| 10,032,276 B1 | 7/2018 | Liu et al. | |
| 10,043,076 B1 | 8/2018 | Zhang et al. | |
| 10,162,362 B2 | 12/2018 | Tsai et al. | |
| 10,366,508 B1 | 7/2019 | Liu et al. | |
| 10,390,003 B1 | 8/2019 | Liu et al. | |
| 10,395,117 B1 | 8/2019 | Zhang et al. | |

(Continued)

*Primary Examiner* — Maurice L. McDowell, Jr.
(74) *Attorney, Agent, or Firm* — Moore & Van Allen PLLC; Anup Shrinivasan Iyer

(57) ABSTRACT

Systems, computer program products, and methods are described herein for immersive deep learning in a virtual reality environment. The present invention is configured to electronically receive, via the extended reality platform, an image of a financial resource; electronically receive, via the extended reality platform, a first user input selecting a machine learning model type; electronically receive, via the extended reality platform, a second user input selecting one or more interaction options; initiate a machine learning model on the image; extract, using the machine learning model, one or more features associated with the image; generate, using the saliency map generator, a saliency map for the image by superimposing the one or more features on the image; and transmit control signals configured to cause the computing device associated with the user to display, via the extended reality platform, the saliency map associated with the image.

18 Claims, 2 Drawing Sheets

(56) References Cited

U.S. PATENT DOCUMENTS

| | | | |
|---|---|---|---|
| 10,402,663 | B1 | 9/2019 | Tsai et al. |
| 10,410,328 | B1 | 9/2019 | Liu et al. |
| 10,453,213 | B2 | 10/2019 | Tsai et al. |
| 10,466,489 | B1 | 11/2019 | Ghazaryan |
| 10,554,940 | B1 | 2/2020 | Ghazaryan |
| 10,571,925 | B1 | 2/2020 | Zhang et al. |
| 10,571,926 | B1 | 2/2020 | Zhang et al. |
| 10,573,060 | B1 | 2/2020 | Ascolese et al. |
| 10,740,957 | B1 | 8/2020 | McElroy et al. |
| 10,943,388 | B1 | 3/2021 | Hosenpud et al. |
| 10,952,006 | B1 | 3/2021 | Krol et al. |
| 10,979,672 | B1 | 4/2021 | Krol et al. |
| 10,984,758 | B1 | 4/2021 | Croxford et al. |
| 11,070,768 | B1 | 7/2021 | Krol et al. |
| 2006/0269167 | A1* | 11/2006 | Venkatesan .......... G06K 9/6892 382/305 |
| 2015/0294405 | A1* | 10/2015 | Hanson ................. G06Q 40/02 705/44 |
| 2017/0154415 | A1* | 6/2017 | Aydin .................... H04N 19/85 |
| 2018/0276892 | A1* | 9/2018 | Isaacs ................... G06T 19/006 |
| 2019/0156128 | A1* | 5/2019 | Zhang .................... G08G 1/167 |
| 2020/0357117 | A1* | 11/2020 | Lyman ................. A61B 6/5205 |
| 2021/0034974 | A1* | 2/2021 | Taylor ...................... G06N 3/08 |
| 2021/0118550 | A1* | 4/2021 | Rahman ................. G06N 20/10 |
| 2021/0192772 | A1* | 6/2021 | Tate ..................... G06K 9/6232 |
| 2021/0327563 | A1* | 10/2021 | He ....................... G06N 3/0454 |
| 2021/0350252 | A1* | 11/2021 | Alexander ............... G06N 5/04 |

\* cited by examiner

SYSTEM FOR IMMERSIVE DEEP LEARNING IN A VIRTUAL REALITY ENVIRONMENT

FIELD OF THE INVENTION

The present invention embraces a system for immersive deep learning in a virtual reality environment.

BACKGROUND

Data visualization in deep learning is crucial to model construction, diagnostics, and a general intuition into how machine learning algorithms function. Proper analysis of machine learning algorithms are often clouded by uncertainty due to high dimensionalities and intermediate layers. These uncertainties may be mitigated if the important features of the input can be visualized. Visualizing the features extracted from the input also helps validate the integrity of the machine learning model. One such visualization technique is an Extended Reality (XR) platform. XR offers distinct advantages over conventional data visualization approaches. Techniques for coding, development, and training are much more immersive, and the intuitive user interfaces bolster the effect of interactivity.

There is a need for a system for immersive deep learning in a virtual reality environment.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, system for immersive deep learning in a virtual reality environment is presented. The system comprising: at least one non-transitory storage device storing an extended reality platform; and at least one processing device coupled to the at least one non-transitory storage device, wherein the at least one processing device is configured to: initiate the extended reality platform for display on a computing device associated with a user; electronically receive, via the extended reality platform, an image of a financial resource; electronically receive, via the extended reality platform, a first user input selecting a machine learning model type; electronically receive, via the extended reality platform, a second user input selecting one or more interaction options, wherein the one or more interaction options comprises at least a saliency map generator; initiate a machine learning model on the image, wherein the machine learning model is associated with the machine learning model type; extract, using the machine learning model, one or more features associated with the image; generate, using the saliency map generator, a saliency map for the image by superimposing the one or more features on the image; and transmit control signals configured to cause the computing device associated with the user to display, via the extended reality platform, the saliency map associated with the image.

In some embodiments, the at least one processing device is further configured to: electronically receive, via the extended reality platform, the second user input selecting the one or more interaction options, wherein the one or more interaction options comprises at least displaying a classification probability.

In some embodiments, the at least one processing device is further configured to: electronically receive, via the extended reality platform, the first user input selecting the machine learning model type, wherein the machine learning model type is at least supervised learning; electronically retrieve, from the machine learning model, one or more pre-defined classes; classify, using the machine learning model, the image into the one or more classes based on at least the one or more features; determine the classification probability associated with the classification of the image into the one or more classes based on at least the second user input; and transmit control signals configured to cause the computing device of the user to display, via the extended reality platform, the classification probability associated with the classification of the image into the one or more classes.

In some embodiments, the at least one processing device is further configured to: electronically receive, via the extended reality platform, the second user input selecting the one or more interaction options, wherein the one or more interaction options comprises at least a user action engine.

In some embodiments, the at least one processing device is further configured to: initiate the user action engine on the extended reality platform based on at least receiving the second user input; electronically receive, using the user action engine, one or more user actions; implement, using the user action engine, the one or more user actions on the image to generate an altered image; initiate the machine learning model on the altered image; extract, using the machine learning model, one or more altered features associated with the altered image; generate, using the saliency map generator, an altered saliency map for altered image by superimposing the one or more altered features on the altered image; and transmit control signals configured to cause the computing device associated with the user to display, via the extended reality platform, the altered saliency map associated with the altered image.

In some embodiments, displaying further comprises displaying the saliency map associated with the image and the altered saliency map associated with the altered image adjacent to each other.

In some embodiments, the at least one processing device is further configured to: electronically receive, via the extended reality platform, the second user input selecting the one or more interaction options, wherein the one or more interaction options comprises at least a distance similarity metric.

In some embodiments, the at least one processing device is further configured to: electronically receive, via the extended reality platform, the first user input selecting the machine learning model type, wherein the machine learning model type is at least unsupervised learning; initiate a vectorization engine on the one or more features associated with the image; map, using the vectorization engine, the one or more features associated with the image into a vector of real numbers in a vector-space; determine the distance similarity measure associated with the one or more features, wherein determining further comprises determining a distance measure between the vector of real numbers representing the one or more features associated with the image and a centroid of a cluster formed by one or more vector representations of one or more images similar to that of the image; and transmit control signals configured to cause the computing device associated with the user to display, via the extended reality platform, the similarity measure.

In some embodiments, the at least one processing device is further configured to: generate, using the saliency map generator, saliency map, wherein the saliency map comprises at least a heatmap.

In some embodiments, the at least one processing device is further configured to: determine one or more weights associated with the one or more features; and generate, using the saliency map generator the heatmap, wherein generating further comprises representing the one or more weighted features in a gradient of visual colorations.

In some embodiments, the at least one processing device is further configured to: electronically receive, from the computing device, a request to initiate the extended reality platform; initiate an authentication request to the user in response to receiving the request; electronically receive, via the computing device, one or more authentication credentials associated with the user; validate the one or more authentication credentials associated with the user; verify an identity of the user based on at least validating the one or more authentication credentials; and initiate the extended reality platform for display on the computing device based on at least verifying the identity of the user.

In some embodiments, the financial resource comprises at least a document, a record, an object, and/or an instrument associated with a financial product, a device, a good, a commodity, and/or a financial service, associated with an entity.

In another aspect, a computer program product for immersive deep learning in a virtual reality environment is presented. The computer program product comprising a non-transitory computer-readable medium comprising code causing a first apparatus to: initiate an extended reality platform for display on a computing device associated with a user; electronically receive, via the extended reality platform, an image of a financial resource; electronically receive, via the extended reality platform, a first user input selecting a machine learning model type; electronically receive, via the extended reality platform, a second user input selecting one or more interaction options, wherein the one or more interaction options comprises at least a saliency map generator; initiate a machine learning model on the image, wherein the machine learning model is associated with the machine learning model type; extract, using the machine learning model, one or more features associated with the image; generate, using the saliency map generator, a saliency map for the image by superimposing the one or more features on the image; and transmit control signals configured to cause the computing device associated with the user to display, via the extended reality platform, the saliency map associated with the image.

In yet another aspect, a method for immersive deep learning in a virtual reality environment is presented. The method comprising: initiating an extended reality platform for display on a computing device associated with a user; electronically receiving, via the extended reality platform, an image of a financial resource; electronically receiving, via the extended reality platform, a first user input selecting a machine learning model type; electronically receiving, via the extended reality platform, a second user input selecting one or more interaction options, wherein the one or more interaction options comprises at least a saliency map generator; initiating a machine learning model on the image, wherein the machine learning model is associated with the machine learning model type; extracting, using the machine learning model, one or more features associated with the image; generating, using the saliency map generator, a saliency map for the image by superimposing the one or more features on the image; and transmitting control signals configured to cause the computing device associated with the user to display, via the extended reality platform, the saliency map associated with the image.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
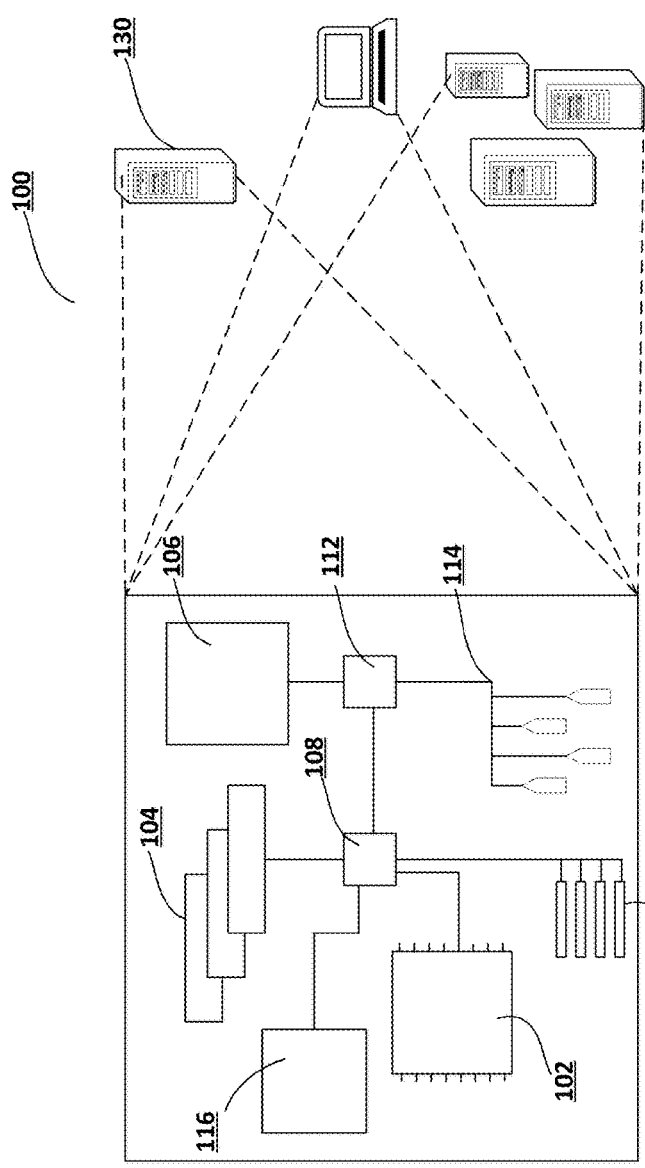
Figure 1:
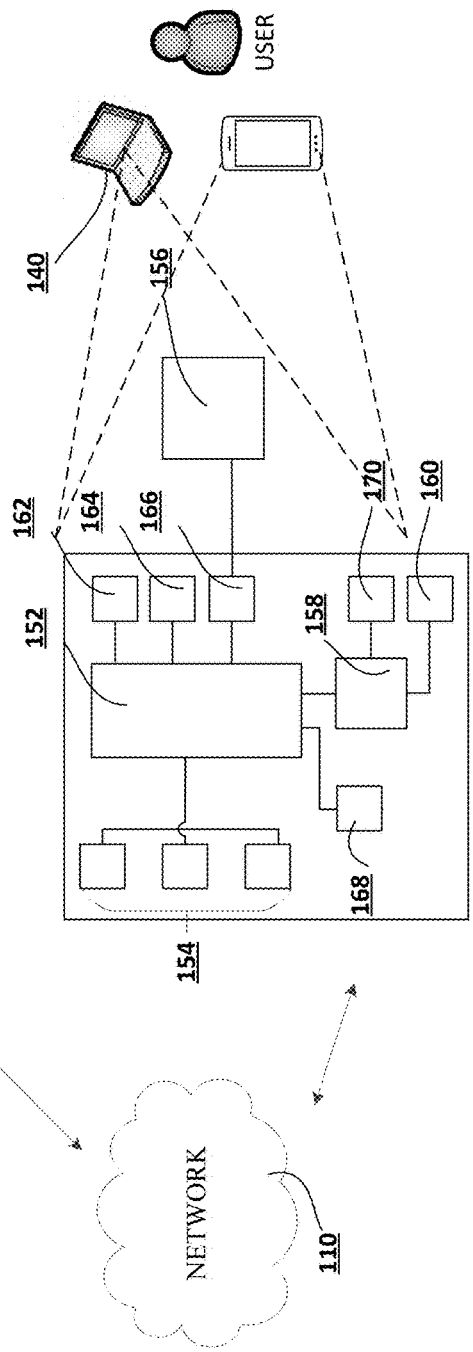
Figure 2:
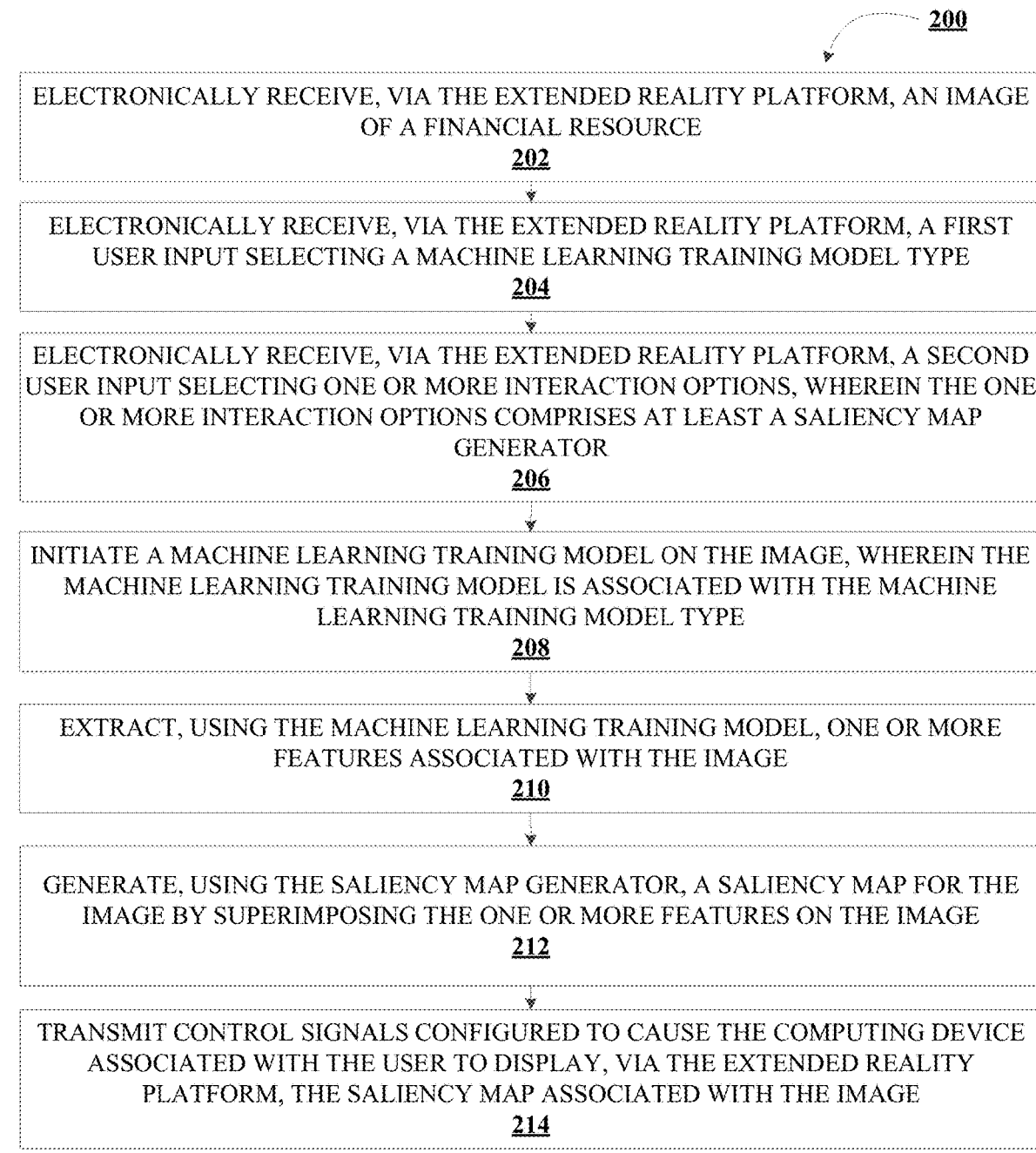

Having thus described embodiments of the invention in general terms, reference will now be made the accompanying drawings, wherein:

FIG. 1 illustrates technical components of a system for immersive deep learning in a virtual reality environment, in accordance with an embodiment of the invention;

FIG. 2 illustrates a process flow for immersive deep learning in a virtual reality environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, a "financial resource" may generally refer to documents, record, object, or instrument associated with products, devices, goods, commodities, services, and the like associated with an entity such as a financial institution.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for immersive deep learning in a virtual reality environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 is intended to represent various forms of mobile devices, such as laptops, personal digital assistants, augmented reality (AR) devices, virtual reality (VR) devices, extended reality (XR) devices, and/or the like, and non-mobile devices such as desktops, video recorders, audio/video player, radio, workstations, and/or the like. The user may be a person who uses the user input system 140 to execute one or more processes described herein using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, video recorders, audio/video player, radio, workstations, personal digital assistants, servers, automated teller machine devices, electronic kiosk devices, blade servers, mainframes, or any combination of the aforementioned. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube)

or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In the document processing industry, machine learning algorithms such as convolutional neural networks (CNNs) play a major role in super resolution, optical character recognition, pre-printed form of extraction, and tabular structure identification. However, proper analysis of machine learning algorithms are often clouded by uncertainty due to high dimensionalities and intermediate layers. These uncertainties may be mitigated if the important features of the input can be visualized. Visualizing the features extracted from the input also helps validate the integrity of the machine learning model and explain the logical decision process employed to arrive at a classification decision. One such visualization technique is an Extended Reality (XR) platform. XR offers distinct advantages over conventional data visualization approaches. Techniques for coding, development, and training are much more immersive, and the intuitive user interfaces bolster the effect of interactivity.

The present invention provides the functional benefit of using saliency maps to represent features extracted from images in an extended reality (XR) environment. XR may refer to all real-and-virtual combined environments and human-machine interactions generated by computing technology and wearables. Representative forms of XR may include augmented reality (AR), virtual reality (VR), mixed reality (MR), and the areas interpolated among them. The levels of virtuality range from partially sensory inputs to immersive virtuality, also called VR. In this regard, the present invention focuses on supervised, unsupervised, and/or semi-supervised machine learning models trained on various features extracted from images of financial resources (e.g., documents, document templates, etc.), and represents these features in the form of saliency maps within an XR environment. The user may visualize these saliency maps via an XR platform (accessible using a virtual/augmented/mixed reality device) and understand how the extracted features are used to classify images of documents.

FIG. 2 illustrates a process flow for immersive deep learning in a virtual reality environment 200, in accordance with an embodiment of the invention. As shown in block 202, the process flow includes electronically receiving, via the extended reality platform, an image of a financial resource. In some embodiments, the system may be configured to capture an image of the financial resource using an image capturing device associated with the computing device of the user. In some other embodiments, the system may be configured to upload previously captured images of the financial resource using the computing device. In this regard, the system may be configured to initiate the XR platform for display on a computing device associated with a user. In one aspect, the computing device associated with the user may be a VR device. An exemplary VR device may be a head-mounted device that provides a virtual reality platform for the user. Such a device may include a stereoscopic head-mounted display (providing separate images for each eye), surround sound, and head motion tracking sensors (which may include gyroscopes, accelerometers, magnetometers, structured light systems, etc.).

In some embodiments, the system may be configured to initiate the XR platform for display via the computing device. In this regard, the system may be configured to electronically receive, a request from the user to initiate the XR platform. The XR platform (e.g., AR platform and/or VR platform) may be a simulated virtual graphic user interface which presents a computer-generated immersive, three-dimensional, interactive environment that is accessed and manipulated using, the computing device. In response to receiving the request, the system may be configured to initiate an authentication request to the user. In response to the authentication request, the system may be configured to electronically receive, via the computing device, one or more authentication credentials associated with the user. In response to receiving the authentication credentials, the system may be configured to validate the one or more authentication credentials and verify the identity of the user. Once the identity of the user is verified, the system may be configured to initiate the XR platform for display on the computing device.

Next, as shown in block 204, the process flow includes electronically receiving, via the extended reality platform, a first user input selecting a machine learning model type. In some embodiments, the one or more machine learning model types may include at least, but is not limited to, supervised learning models, unsupervised learning models, reinforcement learning models, deep learning models, semi-supervised learning models, and/or the like. In some embodiments, each machine learning model type may be associated with a number of pre-trained machine learning models. Each machine learning model is trained the optimal classification parameters are identified. These parameters are then used in the classification of any new input image.

Next, as shown in block 206, the process flow includes electronically receiving, via the extended reality platform, a second user input selecting one or more interaction options, wherein the one or more interaction options comprises at least a saliency map generator. Saliency maps may be used to represent the conspicuity or "saliency" at every location in the visual field by a scalar quantity and to guide the selection of attended locations, based on the spatial distribution of saliency. In some embodiments, saliency maps process images to differentiate visual features in images. For example, colored images are converted to black-and-white images in order to analyze the strongest colors present in them. Other instances would be using infrared to detect temperature (red color is hot and blue is cold) and night vision to detect light sources (green is bright and black is dark). In some embodiments, the saliency map may be a heat map. A heat map may be a graphical representation of data that uses a system of colo-coding to represent different values.

Next, as shown in block 208, the process flow includes initiating a machine learning model on the image, wherein the machine learning model is associated with the machine learning model type. In some embodiments, the system may be configured to initiate one or more machine learning algorithms on the image. In this regard, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable machine learning model type. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

Next, as shown in block 210, the process flow includes extracting, using the machine learning training model, one or more features associated with the image. In some embodiments, the one or more features may be variables associated with observable and measurable property or characteristic of the image being observed that can be quantified and recorded. In one aspect, the one or more features may be selections of raw values from input image, or can be values derived from the raw values.

Next, as shown in block 212, the process flow includes generating, using the saliency map generator, a saliency map for the image by superimposing the one or more features on the image. In some embodiments, the system may be configured to transform the one or more features into a scalar quantity based on the spatial distribution of saliency. In response to transforming the one or more features, the system may be configured to superimpose the transformed features on the image. In doing so, the system may be configured to construct a visual representation of how the machine learning model uses feature extraction to classify the image. In some embodiments, the one or more features may be associated with one or more weights to approximate the optimal degree of influence of individual features on classification. Features with higher weights are given more importance during the classification step than features with lower weights. In one aspect, the system may be configured to generate the saliency map for the image by highlighting features with higher weights more prominently than the features with lower weights.

Next, as shown in block 214, the process flow includes transmitting control signals configured to cause the computing device associated with the user to display, via the extended reality platform, the saliency map associated with the image. In some embodiments, the system may be configured to transmit control signals configured to cause the computing device associated with the user to display, via the extended reality platform, the saliency map associated with the image as soon as the saliency map generator is initiated. In doing so, the user may be able to visualize the saliency map with the transformed features as the saliency map is being populated in real-time. As the saliency map is generated, the user may be able to visualize the features being extracted from the image. In cases where the features are weighted, the user may be able to visualize features as a gradient of visual colorations.

As described herein, the system may be configured to electronically receive, via the extended reality platform, the second user input selecting the one or more interaction options. In some embodiments, the one or more interaction options comprises at least displaying a classification probability. In cases where the machine learning model type is supervised learning, the system may be configured to electronically retrieve, from the machine learning model, one or more pre-defined classes (or class labels). In response to retrieving the pre-defined classes, the system may be configured to classify, using the machine learning model, the image into the one or more classes based on at least the one or more features. In response to classifying the image, the system may be configured to determine the classification probability associated with the classification of the image into the one or more classes based on at least the second user input. In some embodiments, the classification probability indicate a likelihood that the image indeed belongs to the class label that it has been classified into. In response, the system may be configured to transmit control signals configured to cause the computing device of the user to display, via the extended reality platform, the classification probability associated with the classification of the image into the one or more classes.

As described herein, the system may be configured to electronically receive, via the extended reality platform, the second user input selecting the one or more interaction options. In some embodiments, the one or more interaction options comprises at least a user action engine. In some embodiments, the user action engine may be configured to enable the user to manipulate the image by allowing the user to modify and/or edit the image. In one aspect, the system may be configured to initiate the user action engine on the extended reality platform based on at least receiving the second user input. In some embodiments, the user action engine may be displayed on the computing device via the extended reality platform. In one aspect, the user action engine may include a user interface capable of enabling the user to interact with the image. Accordingly, the system may be configured to electronically receive, using the user action engine, one or more user actions. In response, the system may be configured to implement, using the user action engine, the one or more user actions on the image to generate an altered image. In response to generating the altered image, the system may be configured to initiate the machine learning model on the altered image. In some embodiments, the system may be configured to extract, using the machine learning model, one or more altered features associated with the altered image. In response, the system may be configured to generate, using the saliency map generator, an altered saliency map for altered image by superimposing the one or more altered features on the altered image. In response to generating the altered saliency map, the system may be configured to transmit control signals configured to cause the computing device associated with the user to display, via the extended reality platform, the altered saliency map associated with the altered image. In some embodiments, the system may be configured to display the saliency map associated with the image and the altered saliency map associated with the altered image adjacent to each other. In some embodiments, the user may be able to visualize the change in the distribution of feature weights based on the user actions on the image in real-time as the altered saliency maps are being generated.

As described herein, the system may be configured to electronically receive, via the extended reality platform, the second user input selecting the one or more interaction options. In some embodiments, the one or more interaction options comprises at least a distance similarity metric. In some embodiments, the system my be configured to electronically receive, via the extended reality platform, the first user input selecting the machine learning model type, wherein the machine learning model type is at least unsupervised learning. In response, the system may be configured to initiate a vectorization engine on the one or more features associated with the image. In doing so, the system may be configured to map, using the vectorization engine, the one or more features associated with the image into a vector of real numbers in a vector-space. In some embodiments, the system may be configured to initiate the unsupervised machine learning model on the one or more features of the image. In response, the system may be configured to classify the image using the unsupervised machine learning model based the one or more features. In doing so, the one or more features associated with the image are represented in vector space. In some embodiments, the system may be configured to determine the distance similarity measure associated with the one or more features. In one aspect, the system may be configured to a distance measure between the vector of real numbers representing the one or more features associated with the image and a centroid of a cluster formed by one or more vector representations of one or more images similar to that of the image. Typically, each cluster in the vector space represents a grouping of images that are similar to each other, i.e., belonging to the same class. In response to determining the similarity measure, the system may be configured to transmit control signals configured to cause the computing device associated with the user to display, via the extended reality platform, the similarity measure.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for immersive deep learning in a virtual reality environment, the system comprising:
   at least one non-transitory storage device storing an extended reality platform; and
   at least one processing device coupled to the at least one non-transitory storage device, wherein the at least one processing device is configured to:
   initiate the extended reality platform for display on a computing device associated with a user;
   electronically receive, via the extended reality platform, an image of a financial resource;
   electronically receive, via the extended reality platform, a first user input selecting a machine learning model type;
   electronically receive, via the extended reality platform, a second user input selecting one or more interaction options, wherein the one or more interaction options comprises at least a saliency map generator;
   initiate a machine learning model on the image, wherein the machine learning model is associated with the machine learning model type;
   extract, using the machine learning model, one or more features associated with the image;
   generate, using the saliency map generator, a saliency map for the image by superimposing the one or more features on the image;
   transmit control signals configured to cause the computing device associated with the user to display, via the extended reality platform, the saliency map associated with the image;
   electronically receive, via the extended reality platform, the second user input selecting the one or more interaction options, wherein the one or more interaction options comprises at least a distance similarity metric;
   initiate a vectorization engine on the one or more features associated with the image;
   map, using the vectorization engine, the one or more features associated with the image into a vector of real numbers in a vector-space;
   determine the distance similarity measure associated with the one or more features, wherein determining further comprises determining a distance measure between the vector of real numbers representing the one or more features associated with the image and a centroid of a cluster formed by one or more vector representations of one or more images similar to that of the image; and
   transmit control signals configured to cause the computing device associated with the user to display, via the extended reality platform, the similarity measure.

2. The system of claim 1, wherein the at least one processing device is further configured to:
   electronically receive, via the extended reality platform, the second user input selecting the one or more interaction options, wherein the one or more interaction options comprises at least displaying a classification probability.

3. The system of claim 2, wherein the at least one processing device is further configured to:
- electronically receive, via the extended reality platform, the first user input selecting the machine learning model type, wherein the machine learning model type is at least supervised learning;
- electronically retrieve, from the machine learning model, one or more pre-defined classes;
- classify, using the machine learning model, the image into the one or more classes based on at least the one or more features;
- determine the classification probability associated with the classification of the image into the one or more classes based on at least the second user input; and
- transmit control signals configured to cause the computing device of the user to display, via the extended reality platform, the classification probability associated with the classification of the image into the one or more classes.

4. The system of claim 1, wherein the at least one processing device is further configured to:
- electronically receive, via the extended reality platform, the second user input selecting the one or more interaction options, wherein the one or more interaction options comprises at least a user action engine.

5. The system of claim 4, wherein the at least one processing device is further configured to:
- initiate the user action engine on the extended reality platform based on at least receiving the second user input;
- electronically receive, using the user action engine, one or more user actions;
- implement, using the user action engine, the one or more user actions on the image to generate an altered image;
- initiate the machine learning model on the altered image;
- extract, using the machine learning model, one or more altered features associated with the altered image;
- generate, using the saliency map generator, an altered saliency map for altered image by superimposing the one or more altered features on the altered image; and
- transmit control signals configured to cause the computing device associated with the user to display, via the extended reality platform, the altered saliency map associated with the altered image.

6. The system of claim 5, wherein displaying further comprises displaying the saliency map associated with the image and the altered saliency map associated with the altered image adjacent to each other.

7. The system of claim 1, wherein the at least one processing device is further configured to:
- electronically receive, via the extended reality platform, the first user input selecting the machine learning model type, wherein the machine learning model type is at least unsupervised learning.

8. The system of claim 1, wherein the at least one processing device is further configured to:
- generate, using the saliency map generator, the saliency map, wherein the saliency map comprises at least a heatmap.

9. The system of claim 8, wherein the at least one processing device is further configured to:
- determine one or more weights associated with the one or more features; and
- generate, using the saliency map generator the heatmap, wherein generating further comprises representing the one or more weighted features in a gradient of visual colorations.

10. The system of claim 1, wherein the at least one processing device is further configured to:
- electronically receive, from the computing device, a request to initiate the extended reality platform;
- initiate an authentication request to the user in response to receiving the request;
- electronically receive, via the computing device, one or more authentication credentials associated with the user;
- validate the one or more authentication credentials associated with the user;
- verify an identity of the user based on at least validating the one or more authentication credentials; and
- initiate the extended reality platform for display on the computing device based on at least verifying the identity of the user.

11. The system of claim 1, wherein the financial resource comprises at least a document, a record, an object, and/or an instrument associated with a financial product, a device, a good, a commodity, and/or a financial service, associated with an entity.

12. A computer program product for immersive deep learning in a virtual reality environment, the computer program product comprising a non-transitory computer-readable medium comprising code causing a first apparatus to:
- initiate an extended reality platform for display on a computing device associated with a user;
- electronically receive, via the extended reality platform, an image of a financial resource;
- electronically receive, via the extended reality platform, a first user input selecting a machine learning model type;
- electronically receive, via the extended reality platform, a second user input selecting one or more interaction options, wherein the one or more interaction options comprises at least a saliency map generator;
- initiate a machine learning model on the image, wherein the machine learning model is associated with the machine learning model type;
- extract, using the machine learning model, one or more features associated with the image;
- generate, using the saliency map generator, a saliency map for the image by superimposing the one or more features on the image;
- transmit control signals configured to cause the computing device associated with the user to display, via the extended reality platform, the saliency map associated with the image;
- electronically receive, via the extended reality platform, the second user input selecting the one or more interaction options, wherein the one or more interaction options comprises at least a distance similarity metric;
- initiate a vectorization engine on the one or more features associated with the image;
- map, using the vectorization engine, the one or more features associated with the image into a vector of real numbers in a vector-space;
- determine the distance similarity measure associated with the one or more features, wherein determining further comprises determining a distance measure between the vector of real numbers representing the one or more features associated with the image and a centroid of a cluster formed by one or more vector representations of one or more images similar to that of the image; and transmit control signals configured to cause the computing device associated with the user to display, via the extended reality platform, the similarity measure.

13. The computer program product of claim 12, wherein the first apparatus is further configured to:
electronically receive, via the extended reality platform, the second user input selecting the one or more interaction options, wherein the one or more interaction options comprises at least displaying a classification probability.

14. The computer program product of claim 13, wherein the first apparatus is further configured to:
electronically receive, via the extended reality platform, the first user input selecting the machine learning model type, wherein the machine learning model type is at least supervised learning;
electronically retrieve, from the machine learning model, one or more pre-defined classes;
classify, using the machine learning model, the image into the one or more classes based on at least the one or more features;
determine the classification probability associated with the classification of the image into the one or more classes based on at least the second user input; and
transmit control signals configured to cause the computing device of the user to display, via the extended reality platform, the classification probability associated with the classification of the image into the one or more classes.

15. The computer program product of claim 12, wherein the first apparatus is further configured to:
electronically receive, via the extended reality platform, the second user input selecting the one or more interaction options, wherein the one or more interaction options comprises at least a user action engine.

16. The computer program product of claim 15, wherein the first apparatus is further configured to:
initiate the user action engine on the extended reality platform based on at least receiving the second user input;
electronically receive, using the user action engine, one or more user actions;
implement, using the user action engine, the one or more user actions on the image to generate an altered image;
initiate the machine learning model on the altered image;
extract, using the machine learning model, one or more altered features associated with the altered image;
generate, using the saliency map generator, an altered saliency map for altered image by superimposing the one or more altered features on the altered image; and
transmit control signals configured to cause the computing device associated with the user to display, via the extended reality platform, the altered saliency map associated with the altered image.

17. The computer program product of claim 16, wherein displaying further comprises displaying the saliency map associated with the image and the altered saliency map associated with the altered image adjacent to each other.

18. A method for immersive deep learning in a virtual reality environment, the method comprising:
initiating an extended reality platform for display on a computing device associated with a user;
electronically receiving, via the extended reality platform, an image of a financial resource;
electronically receiving, via the extended reality platform, a first user input selecting a machine learning model type;
electronically receiving, via the extended reality platform, a second user input selecting one or more interaction options, wherein the one or more interaction options comprises at least a saliency map generator;
initiating a machine learning model on the image, wherein the machine learning model is associated with the machine learning model type;
extracting, using the machine learning model, one or more features associated with the image;
generating, using the saliency map generator, a saliency map for the image by superimposing the one or more features on the image;
transmitting control signals configured to cause the computing device associated with the user to display, via the extended reality platform, the saliency map associated with the image;
electronically receiving, via the extended reality platform, the second user input selecting the one or more interaction options, wherein the one or more interaction options comprises at least a distance similarity metric;
initiating a vectorization engine on the one or more features associated with the image;
mapping, using the vectorization engine, the one or more features associated with the image into a vector of real numbers in a vector-space;
determining the distance similarity measure associated with the one or more features, wherein determining further comprises determining a distance measure between the vector of real numbers representing the one or more features associated with the image and a centroid of a cluster formed by one or more vector representations of one or more images similar to that of the image; and
transmitting control signals configured to cause the computing device associated with the user to display, via the extended reality platform, the similarity measure.

* * * * *